United States Patent
Fan et al.

(10) Patent No.: US 8,294,952 B2
(45) Date of Patent: Oct. 23, 2012

(54) MEMORY EFFICIENT HIERARCHICAL ERROR DIFFUSION WITH COLOR CONSISTENCY CONSTRAINTS

(75) Inventors: Zhigang Fan, Webster, NY (US); Zhen He, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 569 days.

(21) Appl. No.: 12/613,069

(22) Filed: Nov. 5, 2009

(65) Prior Publication Data

US 2011/0102848 A1    May 5, 2011

(51) Int. Cl.
 *H04N 1/405* (2006.01)
 *H04N 1/60* (2006.01)
 *H04N 1/46* (2006.01)
 *G06K 9/00* (2006.01)

(52) U.S. Cl. ...... 358/3.06; 358/1.9; 358/3.03; 358/3.05; 358/534; 358/536; 382/162; 382/167; 382/252

(58) Field of Classification Search .............. 358/3.06, 358/1.9, 3.05, 3.03, 534, 536; 382/162, 167, 382/252
See application file for complete search history.

(56) References Cited

U.S. PATENT DOCUMENTS

| | | | | |
|---|---|---|---|---|
| 5,991,438 A | * | 11/1999 | Shaked et al. | 382/162 |
| 6,157,462 A | * | 12/2000 | Fan | 358/1.9 |
| 6,891,641 B1 | | 5/2005 | Kouzaki | |
| 7,417,772 B2 | | 8/2008 | Chang | |
| 7,483,169 B2 | * | 1/2009 | Murakami | 358/1.9 |
| 2009/0195836 A1 | | 8/2009 | He | |

OTHER PUBLICATIONS

Shiau, J. et al., "A Set of Easily Implementable Coefficients in Error Diffusiuon with Reduced Worm Artifacts", Proc. IS&T/SPIE Symposium on Electronic Imaging Science & Technology, San Jose, CA, Jan. 1996.

* cited by examiner

*Primary Examiner* — Charlotte M Baker
(74) *Attorney, Agent, or Firm* — Fay Sharpe LLP

(57) ABSTRACT

A halftoning process includes: receiving CMYK input pixel data in terms of continuous tone input data values for cyan, magenta, yellow, and black colors converting the CMYK input pixel data to modified CMYKRGB* pixel data that define the input pixel in terms of error-adjusted continuous tone data values quantizing the modified CMYKRGB* pixel data to derive intermediate output CMYKRGB pixel data in which the cyan, magenta, yellow, black, red, green, and blue colors are each defined by either a first quantized value that represents no color or a second quantized pixel value that represents full color converting the intermediate output CMYKRGB pixel data to CMYK output data.

20 Claims, 4 Drawing Sheets

MEMORY EFFICIENT HIERARCHICAL ERROR DIFFUSION WITH COLOR CONSISTENCY CONSTRAINTS

BACKGROUND

Error diffusion is a well-known halftone method in which continuous tone or "contone" color image input data values are converted to binary values that are able to be printed on paper or other recording media using a xerographic, ink-jet, solid-ink or other color marking device that outputs each colorant in a binary fashion, i.e. each colorant channel is either "off" (not output) or "on" (output) or for each pixel location in the output image. Each contone input pixel value (e.g., ranging between 0 to 1 or between 0 to 255 or other range that can vary) is "quantized" by comparing its value relative to a threshold and the corresponding output pixel in the printed image is set to "on" or "off" depending upon whether the threshold is satisfied or not. The "error" by which the contone input pixel value differs the binary output value is propagated or "diffused" to future input pixels yet to be quantized, such that the error is accounted for in future processing and, thus, is preserved and influences later quantization operations and the appearance of the resulting output image.

For black-and-white (or other monochrome) images, the error is propagated to future pixels in the same row and/or different rows using various known techniques. Color images are relatively more complex. In "scalar" or "separable" error diffusion, the input images for each color plane or separation of the color image are processed as individual monochrome images in a manner similar to black-and-white images.

Another color error diffusion technique is "vector" error diffusion, which generally produces higher-quality printed output. Vector error diffusion operates in a selected color space. Each input value is located in the color space as defined by its coordinates. Each input color value is mapped to a set of possible output values within the color space, and the closest member of the set of possible output values is selected as the output value. The resulting error, defined by the difference from the input coordinates to the output coordinates, is propagated to the next input value. A drawback of vector error diffusion is the increased computational complexity and resulting need for data buffers.

Traditional vector error diffusion methods operate in the output color space (e.g., CMYK). Specifically, all input, modified input (input+error), output and error values are specified in CMYK (CMYK is used herein as an example of an output color space, but others are possible as generally known in the art). While these methods generally result in output images of good quality, main challenges presented include: (i) elegant treatment of black (K); (ii) uniform distribution of the darkest colorant dots (i.e., the mixture of black (K) and blue (M+C=M overlapped with C); (iii) minimization of artifacts due to accumulation of errors.

More recently, Hierarchical Error Diffusion (HED) has been implemented. In HED, the CMYK signals are first converted to CMYKRGB color space using Minimum Brightness Variation Criterion (MBVC), and the remaining calculations (modified input generation, output determination, error calculation) are performed in the CMYKRGB color space. The output is generated in a hierarchical fashion from darker dots to lighter dots. HED provides significant improvements in image quality, but requires a seven channel buffer to store errors in CMYKRGB (instead of a four channel buffer for CMYK). This substantially increases the cost for the machines that implement halftoning in hardware.

Memory Efficient Hierarchical Error Diffusion (MEHED) has also been proposed. Unlike original HED, it uses a four channel CMYK error buffer. The conversion from CMYK to CMYKRGB is performed on modified input values (input+error) instead of on the (original) input values, and the resulting CMYKRGB error is converted back to CMYK color space. A main technical difficulty is the color space conversion for the modified input, because the modified input can be <0 (negative) or >1, which are beyond the range required for MBVC. Thus, MEHED decomposes the modified input into three parts: (i) negative; (ii) regular; (iii) surplus and carefully shares information among these three parts. An advantage of MEHED over HED is that it does not require additional buffering space. A main disadvantage is the high computational complexity which increases machine cost and processing time. Overall image quality for MEHED is comparable to HED. Because MEHED is sub-optimal with respective to MBVC, it is slightly less smooth than HED for uniform color or slowing varying color. On the other hand, MEHED is also slightly less sensitive to noise in rough (high texture) areas.

SUMMARY

In accordance with one aspect of the present development, a halftoning process for printing digital images comprises: receiving CMYK input pixel data that define an input pixel of an input digital image in terms of continuous tone input data values for cyan, magenta, yellow, and black colors, wherein I(C), I(M), I(Y), I(K) respectively correspond to the continuous tone input data value for the cyan, magenta, yellow, and black colors; converting the CMYK input pixel data to modified CMYKRGB* pixel data that define the input pixel in terms of error-adjusted continuous tone data values for the cyan, magenta, yellow, and black colors, and also in terms of red, green and blue colors, wherein I*(C), I*(M), I*(Y), I*(K), I*(R), I*(G), I*(B) respectively correspond to the error-adjusted converted continuous tone input data values for the cyan, magenta, yellow, black, red, green, blue colors; quantizing the modified CMYKRGB* pixel data to derive intermediate output CMYKRGB pixel data in which the cyan, magenta, yellow, black, red, green, and blue colors are each defined by either a first quantized value that represents no color or a second quantized pixel value that represents full color, wherein O'(C), O' (M), O'(Y), O'(K), O'(R), O'(G), O'(B) respectively define said intermediate output pixel data for the cyan, magenta, yellow, black, red, green, and blue colors, and wherein the intermediate output CMYKRGB pixel data define an output pixel that corresponds to the input pixel; converting the intermediate output CMYKRGB pixel data to CMYK output data in which the output pixel is defined in terms of CMYK output values O(C), O(M), O(Y), O(K) respectively for the cyan, magenta, yellow, and black colors, wherein each of the CMYK output values is defined by either a first output value representing no color or a second output value representing full color.

In accordance with another aspect of the present development, an image processing apparatus comprises: means for halftoning an input image comprising a plurality of input pixels each defined by continuous tone CMYK values to derive an output image comprising a plurality of output pixel each defined by binary CMYK values. The means for halftoning comprises: means for receiving CMYK input pixel data that define an input pixel of an input digital image in terms of continuous tone input data values for cyan, magenta, yellow, and black colors, wherein I(C), I(M), I(Y), I(K) respectively correspond to the continuous tone input data value for the cyan, magenta, yellow, and black colors; means for converting the CMYK input pixel data to modified CMYKRGB* pixel data that define the input pixel in terms of error-adjusted continuous tone data values for said cyan, magenta, yellow, and black colors, and also in terms of red, green and blue colors, wherein I*(C), I*(M), I*(Y), I*(K), I*(R), I*(G), I*(B) respectively correspond to the error-adjusted converted continuous tone input data values for the cyan, magenta, yellow, black, red, green, blue colors; means for quantizing the modified CMYKRGB* pixel data to derive intermediate output CMYKRGB pixel data in which the cyan, magenta, yellow, black, red, green, and blue colors are each defined by either a first quantized value that represents no color or a second quantized pixel value that represents full color, said intermediate output CMYKRGB pixel data defining an output pixel that corresponds to the input pixel; means converting the intermediate output CMYKRGB pixel data to CMYK output data in which the output pixel is defined in terms of CMYK output values O(C), O(M), O(Y), O(K) respectively for the cyan, magenta, yellow, and black colors, wherein each of the CMYK output values is defined by either a first output value representing no color or a second output value representing full color.

In accordance with another aspect of the present development, a halftoning process for printing digital images comprises: receiving CMYK error values resulting from a first quantization operation relating to a first CMYK input pixel of an input image; receiving CMYK input data representing a second CMYK input pixel of the input image; converting the CMYK input data to error-adjusted CMYKRGB* pixel data using the CMYK error values; performing a second quantization operation to quantize the error-adjusted CMYKRGB* pixel data to derive intermediate binary CMYKRGB output pixel data; converting the intermediate binary CMYKRGB output pixel data to binary CMYK output data in which an output pixel corresponding to the second CMYK input pixel is defined in terms of binary CMYK output values.

DETAILED DESCRIPTION

The present development is described using conventional terminology for digital image processing insofar as the color channels/signals and colorants are concerned. Specifically, the following designations are used herein: C=cyan, M=magenta, Y=yellow, K=black, R=red, G=green, B=blue, W=white, (CMY)=composite black (i.e., black defined by a combination of CMY). Furthermore, an asterisk (*) is used to indicate "modified" input, i.e., an input value to which an error value from the same color channel resulting from a previous quantization operation has been added or an input value that is otherwise modified as specified herein.

Figure 1:
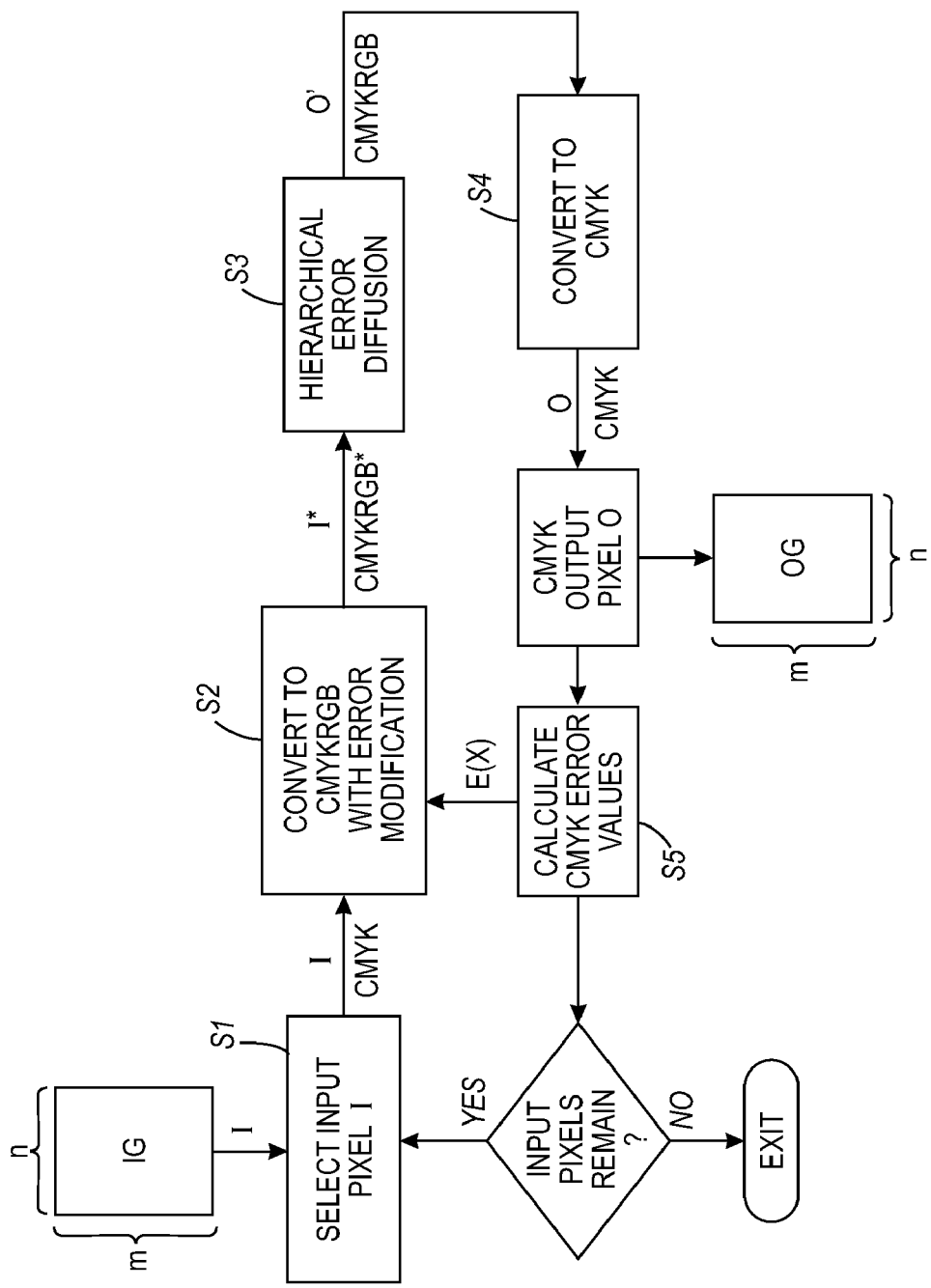
FIG. 1 is a flow chart that illustrates a hierarchical error diffusion method according to the present development.

FIG. 1 is a flow chart that illustrates a hierarchical error diffusion method according to the present development. An input image IG to be printed is specified in CMYK color space as is generally known in the art. The input image IG is defined as an m×n matrix of m rows and n columns of input pixels I, each of which is defined in CMYK color space by continuous tone values in the range of 0-1 (this specification assumes all input pixel values are normalized to the range of 0-1). The individual continuous tone CMYK color channel values for the input pixel are referenced herein as I(X), wherein X=C, M, Y, or K, respectively.

In a step S1, a CMYK input pixel I of the input image IG is selected for error diffusion processing according to the present development. The input pixels I of the input image IG are selected in a predetermined sequential fashion, such as beginning with the uppermost (top) left input pixel and moving sequentially from left to right before moving down to the next sequential row.

In a conversion step S2, the selected input pixel I is:
converted from CMYK color space to CMYKRGB color space; and,
modified based upon error values propagated from a previous quantization operation.

The conversion step S2 includes using a special two-stage process as described below in connection with FIGS. 2 and 3. As a result of the conversion step S2, the CMYK input pixel I is represented in CMYKRGB color space and also is modified to account for CMYK error values derived from a previous quantization operation. Accordingly, the result of the conversion step S2 is designated herein as a modified input pixel I* (and the state of the modified input pixel I* is sometimes indicated as CMYKRGB* to indicate that the modified input pixel I* is defined in the CMYKRGB color space and has been modified to account for the available CMYK error values). The individual error-modified continuous CMYKRGB color channel values for the modified input pixel I* are referenced herein as I*(X), wherein X=C, M, Y, K, R, G, or B, respectively. Also, during conversion operations involving the CMYKBW color space as set forth below, I(W) represents the continuous tone value for the white color channel of the input pixel I and I*(W) represents the modified continuous tone value for the white color channel of the input pixel I.

In a step S3, the modified input pixel I* is subjected to a hierarchical error diffusion operation in which the continuous tone values (e.g., ranging between 0 and 1) for each of its CMYKRGB color channels are quantized such that one and only one of the CMYKRGB color channels thereof is set to "on" or full color (i.e., "1"), and the others are set to "off" or no color (i.e., "0"). It should be noted that, as used herein, the binary value "1" is deemed to represent "on" (full color) and the binary value "0" is deemed to represent "off" (no color), but the opposite convention can be used if desired.

This result of the hierarchical error diffusion operation S3 is an intermediate output pixel O' defined in the CMYKRGB color space, wherein no more than one of the color channels has a binary value of "on" ("1") and the remainder have binary values of "off" ("0") (if all color channels CMYKRGB are "off" the result is W=white or no colorant). The intermediate output pixel O' has a spatial location in an output image OG that corresponds to the spatial location of the input pixel I in the input image IG. The individual binary CMYKRGB color channel values for an intermediate output pixel O' are referenced herein as O'(X), wherein X=C, M, Y, K, R, G, or B, respectively.

In a step S4, the intermediate output pixel O' is converted from CMYKRGB color space to CMYK color space to define the output pixel O that corresponds to the processed input pixel I in the CMYK color space. The CMYK data for the output pixel O provide binary inputs ("off" or "on") for each color channel of the CMYK color space. The individual binary CMYK color channel values for the output pixel O are referenced herein as O(X), wherein X=C, M, Y, or K, respectively.

In a step S5, an error value E associated with CMYK color channel of the output pixel O is derived. The binary CMYK color channel value of the output pixel O is subtracted from the corresponding error-modified continuous tone CMYK color channel value of the input pixel I to derive the error value E(X) for each color channel, wherein X=C, M, Y or K, according to:

E(C)=I*(C)−O(C) E(M)=I*(M)−O(M)
E(Y)=I*(Y)−O(Y) E(K)=I*(K)−O(K)

As noted above, unless otherwise specified herein:
I*(C)=I(C)+E(C)
I*(M)=I(M)+E(M)
I*(Y)=I(Y)+E(Y)
I*(K)=I(K)+E(K)

The error is propagated to the pixels that have not been processed.

Processing then returns to step S1 for selection of the next input pixel I to be processed. The process repeats until all input pixels I of the input image IG are processed, such that the output image OG is derived including a plurality of output pixels O each defined by binary CMYK outputs, each of which corresponds to one of the input pixels I of the input image IG. Because each output pixel value O is defined in term of binary CMYK values ("0" or "1"), the output image can be printed using a xerographic, ink-jet, solid-ink or other color marking device that requires a binary value for each color channel for each output pixel O.

Figure 2:
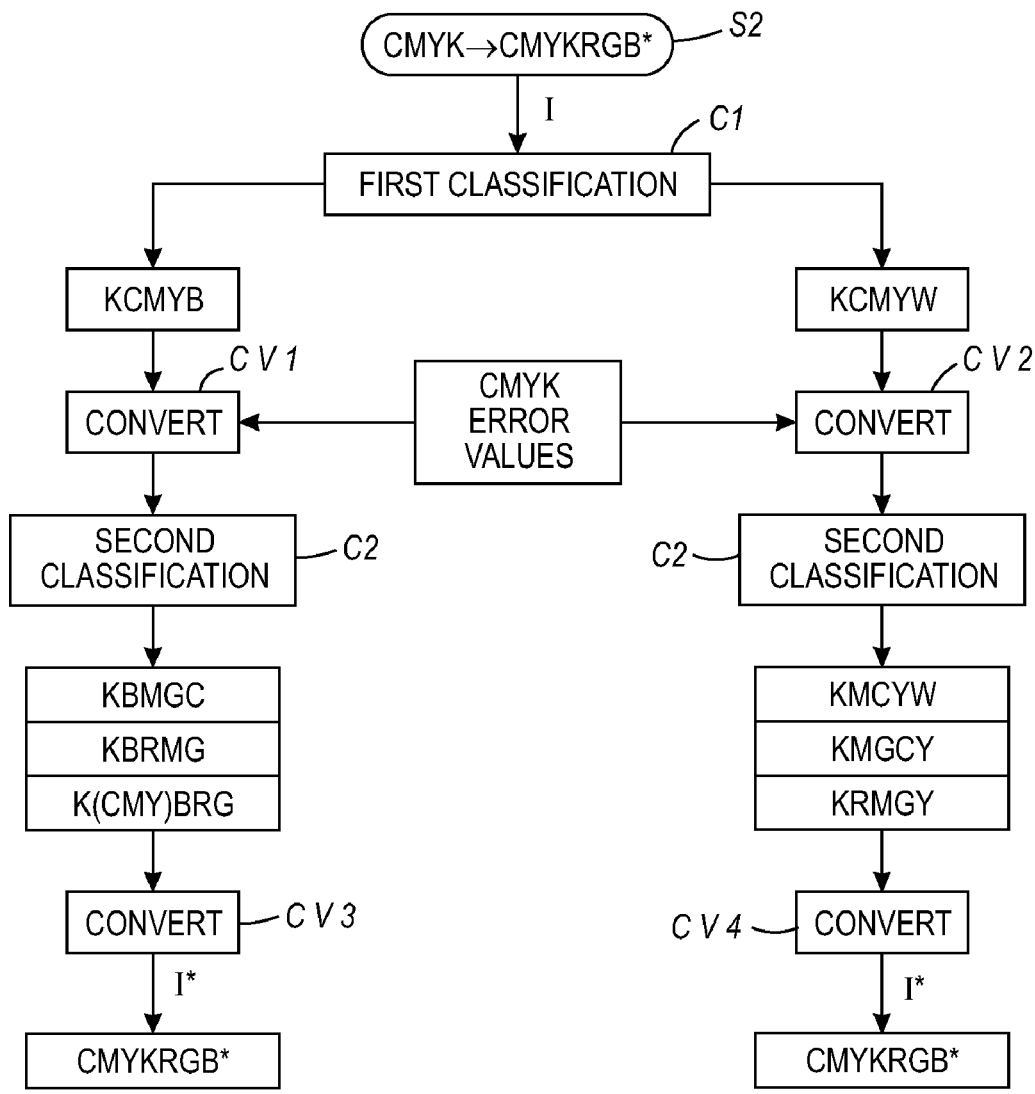
FIG. 2 is a flow chart that illustrates the conversion step S2 of FIG. 1 in further detail.
Figure 3:
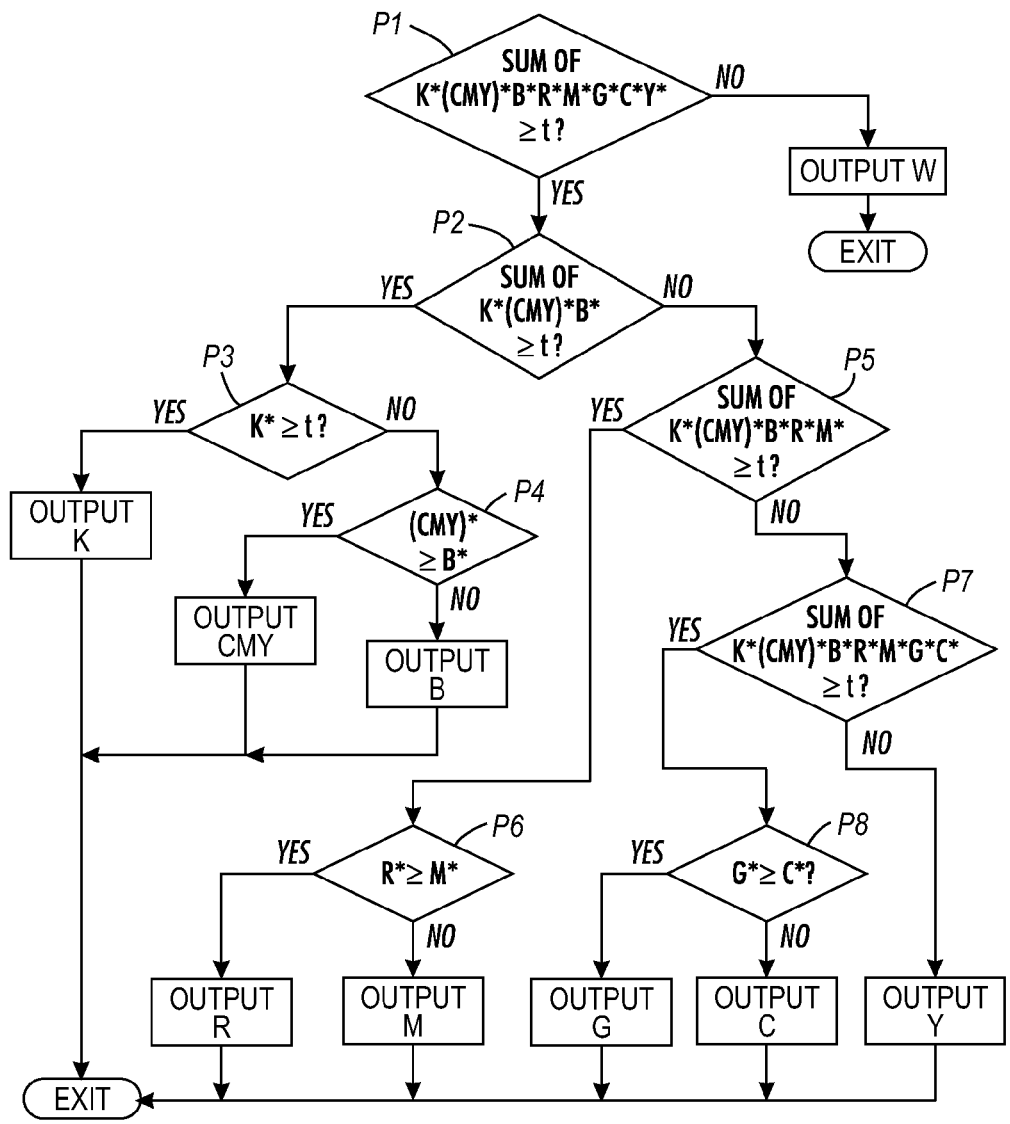
FIG. 3 is a flow chart that illustrates a hierarchical error diffusion quantization process for determining output pixel values in CMYKRGB color space.

FIG. 2 is a flow chart that illustrates the conversion step S2 of FIG. 1 in further detail. As noted above, the conversion step S2 receives the CMYK continuous tone values for the input pixel I and converts same into the CMYKRGB color space, and also modifies the CMYKRGB continuous tone values to account for the error values E(X) (i.e., E(C), E(M), E(Y), E(K)) propagated from a previous quantization operation relating to a previous input pixel I. The CMYK values for the input pixel I are input to a first classification step C1 in which the input pixel I is classified as either:

KCMYB (containing blue (B)); or
KCMYW (not containing blue (B)).

In one example, the first classification step C1 uses:
SP=I(C)+I(M)+I(K)−1 and classifies the input pixel I as KCMYB if SP>0, otherwise the pixel is classified as KCMYW.

If the input pixel is classified as KCMYB (containing blue), a first conversion step CV1 is performed as follows to convert the input pixel I into CMYKBW color space:

SP=I(C)+I(M)+I(K)−1
SP*=I*(C)+I*(M)+I*(K)
I(B)=SP I(W)=0 I(C)=I(C)−SP I(M)=I(M)−SP
I*(B)=SP* I*(W)=0 I*(C)=I*(C)−SP* I*(M)=I*(M)−SP*
I(Y)=I(Y) I(K)=I(K)

(note that the Y and K components of the input pixel I are left unaltered).

If the input pixel is classified as KCMYW (not containing blue), a second conversion step CV2 is performed as follows to convert the input pixel I into CMYKBW color space:

SP=I(C)+I(M)+I(K)−1
SP*=I*(C)+I*(M)+I*(K)
I(B)=0 I(W)=−SP
I*(B)=0 I*(W)=−SP*
I(Y)=I(Y) I(K)=I(K) I(C)=I(C) I(M)=I(M)

(note that the Y, C, M, and K components of the input pixel I are left unaltered).

If the input pixel I is classified as KCMYB (containing blue), the second classification operation C2 classifies the input pixel I as one of KBMGC, KBRMG, or K(CMY)BRG as follows:

If I(Y)>1−I(K)−I(B), class=K(CMY)BRG
If 1−I(K)−I(B)≧I(Y)>1−I(K)−I(B)−I(C), class=KBRMG
Otherwise 1−I(K)−I(B)−I(C)≧I(Y), class=KBMGC In such case the following conversions are performed by a third conversion step CV3: for class=K(CMY)BRG I*(CMY)=I*(Y)−I*(C)−I*(M)
I*(B)=I*(B)−I*(CMY)
I*(G)=I*(C) I*(R) M) I*(K)=I*(K)
I*(W)=I*(Y)=I*(C)=I*(M)=0 for class=KBRMG
I*(R)=I*(Y)−I*(C)
I*(M)=I*(M)−I*(R)
I*(B)=I*(B)
I*(G)=I*(C)
I*(W)=I*(Y)=I*(C)=I*(CMY)=0
I*(K)=I*(K)

for class=KBMGC
I*(G)=I*(Y)
I*(C)=I*(C)−I*(Y)
I*(B)=I*(B)
I*(M)=I*(M)
I*(W)=I*(Y)=I*(R)=I*(CMY)=0
I*(K)=I*(K)

If the input pixel I is classified as KCMYW (not containing blue), the second classification operation C2 classifies the input pixel I as one of KMCYW, KMGCY, or KRMGY as follows:

If I(Y)>1−I(K)−I(M), class=KRMGY
If 1−I(K)−I(M)≧I(Y)>1−I(K)−I(M)−I(C), class=KMGCY
Otherwise 1−I(K)−I(M)−I(C)≧I(Y), class=KMCYW In such case the following conversions are performed by a fourth conversion step CV4:

for class=KRMGY
I*(R)=I*(Y)−I*(C)−I*(W)
I*(M)=M)−I*(R)
I*(Y)=I*(W)
I*(G)=I*(C)
I*(W)=I*(C)=I*(B)=I*(CMY)=0
I*(K)=I*(K)

for class=KMGCY
I*(G)=I*(Y)−I*(W)
I*(C)=I*(C)−I*(G)
I*(M)=I*(M)
I*(Y)=I*(W)
I*(W)=I*(R)=I*(B)=I*(CMY)=0
I*(K)=I*(K)

for class=KMCYW
I*(Y)=I*(Y)
I*(W)=I*(W)−I*(Y)
I*(C)=I*(C)
I*(M)=I*(M)
I*(R)=I*(G)=I*(B)=I*(CMY)=0
I*(K)=I*(K)

Completion of the process S2 of FIG. 2, results in the provision of the error-modified (CMYKRGB*) data defining the modified input pixel I* that is then input to the hierarchical error diffusion step S3 as describe above. FIG. 3 is a flow chart that illustrates a hierarchical error diffusion process in accordance with the present development for determining the color channel data defining the intermediate output pixel O' in the CMYKRGB color space. To simplify the flow chart of FIG. 3, the designations I*(K), I*(CMY), I*(B), I*(R), I*(M), I*(G), I*(C), I*(Y) have been changed to K*, (CMY)*, B*, R*, M*, G*, C*, Y*, respectively.

In a process P1, the sum of K*, (CMY)*, B*, R*, M*, G*, C*, Y*, is compared to a threshold t (e.g., t=0.5). If the sum is <t, then the result of the hierarchical error diffusion operation is W (white) such that all CMYKRGB color channels O'(X), X=C,M,Y,K,R,G,B are set to 0 (no color) otherwise, if the sum is ≧t a process P2 is implemented.

In the process P2, the sum of K*, (CMY)*, B* is compared to the threshold t. If the sum is ≧t, process P3 is implemented to compare K* to t and, if K*≧t, the result of the hierarchical error diffusion operation is K (black) such that the K color channel O'(K) is set to 1 (full color) and all others are set to 0 (no color). If K*<t, a process P4 is implemented.

In the process P4, (CMY)* is compared to B*. If (CMY)*≧B*, the result of the hierarchical error diffusion operation is (CMY), i.e., composite black, such that the (CMY) color channel O'(CMY) is set to 1 (full color for each of C, M, Y) and all other color channels are set to 0 (no color). If (CMY)*<B, the result of the hierarchical error diffusion operation is B (blue) such that the B (blue) color channel O'(B) is set to 1 (full color) and all others are set to 0 (no color).

If the sum from process P2 is <t, the process P5 is implemented. In the process P5, the sum of K*, (CMY)*, B*, R*, M* is compared to the threshold t. If the sum is ≧t, process P6 is implemented to compare R* to M*. If R*≧M*, the result of the hierarchical error diffusion operation is R (red) such that the R color channel O'(R) is set to 1 (full color) and all others are set to 0 (no color). If R*<M* in process P6, the result of the hierarchical error diffusion operation is M (magenta) such that the M color channel O'(M) is set to 1 (full color) and all others are set to 0 (no color). If the sum from process P5 is <t, the process P7 is implemented.

In the process P7, the sum of K*, (CMY)*, B*, R*, M*, G*, C* is compared to the threshold t. If the sum is ≧t, process P8 is implemented to compare G* to C. If G*≧C*, the result of the hierarchical error diffusion operation is G (green) such that the G color channel O'(G) is set to 1 (full color) and all others are set to 0 (no color). If G*<C* in process P8, the result of the hierarchical error diffusion operation is C (cyan) such that the C color channel O'(C) is set to 1 (full color) and all others are set to 0 (no color). If the sum from process P7 is <t, the result of the hierarchical error diffusion operation is Y (yellow) such that the Y color channel O'(Y) is set to 1 (full color) and all others are set to 0 (no color).

The above-described procedure can be expressed in the following pseudo code. As described above in relation to FIG. 3, it is assumed that the decision hierarchy is in the order of: sum of K*(CMY)*B*R*M*G*C*Y*; sum of K*(CMY)*B*; sum of K*(CMY)*B*R*M*; R; M; sum of K*(CMY)*B*R*M*G*C*; G*; C*; Y*. Also, t is the quantization threshold (typically t=0.5); I[0]=I(W), I[1]=I(C), I[2]=I(M), and I[3]=I(B), respectively; and, I*[1]=I*(C), I*[2]=I*(M), and I*[3]=I*(B), respectively. O(X) is the output for color X (X=C, M, Y, K). For certain printers, it is desirable to replace (C=1, M=1, Y=1) with K=1, and this can be performed optionally after calculation of the error values by conventional methods.

Pseudo Code:

```
O(C) = O(M) = O(Y) = O(K) = 0
if (I*[0] – I*(Y) < t){
    s = I*(K) + I*[3];
```

Pseudo Code:

```
    s1= 2 * (I*(Y) + I*(K)) – 1);
    s2 = I[0] + I[1] + I[2]
    for (layer = 3; layer > 0; layer --){
        if (s >= t) {
            if (I*(K) >= t) O(K) = 1; //output K
            else if (s1 >= –I*[layer] && I(Y) >= s2) O(Y) = 1;
            break;
        }
        s += I*[layer – 1];
        s1 += 2 * I*[layer];
        s2 –= I[layer];
    }
    if (layer = = 0) O(Y) = 1;
    else if (layer = = 1) O(C) = 1;
    else if (layer = = 2) O(M) = 1;
    else O(C) = O(M) = 1;
}
```

Figure 4:
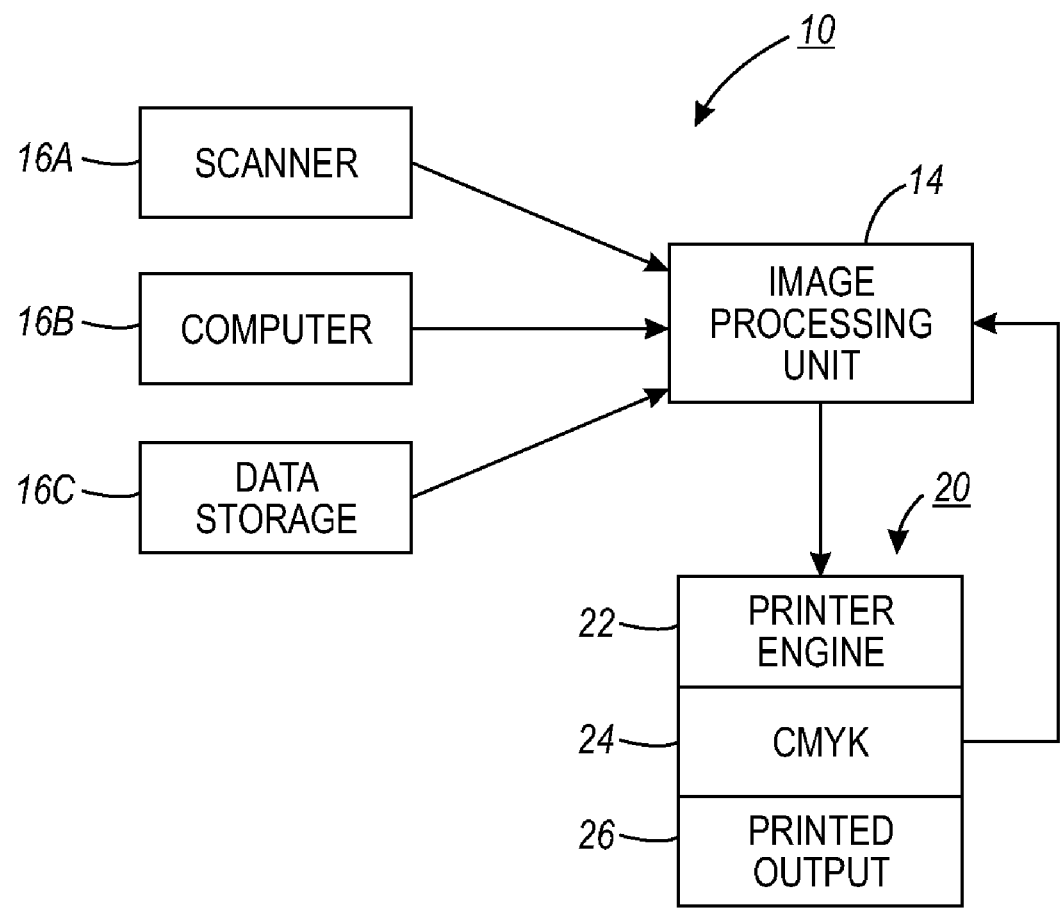
FIG. 4 illustrates one example of an apparatus that implements a method in accordance with the present development.

The system and method in accordance with the present development are preferably implemented in a printing system such as any commercially available multi-colorant ("color") printer, which can be provided as part of a printing and/or reproduction apparatus. Typically, the printer implements a CMYK color space and includes a xerographic or ink-jet printer engine, although the present development is applicable to other printing methods. FIG. 4 illustrates one example of an apparatus for implementing a method in accordance with the present development. The apparatus 10 comprises an image processing unit (IPU) 14 for carrying out the digital image processing operations disclosed herein, including the various classification, conversion, error diffusion (quantization), and error calculation operations. The IPU 14 is defined by electronic circuitry and/or software that is dedicated to digital image processing and/or can comprise a general purpose computer programmed to implement the image processing operations disclosed herein. The IPU 14 is adapted to receive data defining an input image IG from a source such as a scanner 16A, computer 16B (e.g., a digital front-end (DFE)), and/or data storage 16C or another source that is part of the apparatus 10 and/or that is operably connected to the IPU 14 through a network or other means. The apparatus 10 comprises an image output or printing unit 20 including a xerographic, ink-jet, or other print engine 22 for printing the image data that define the output image OG on paper or another recording medium using a CMYK or other multi-colorant color space 24. The printer unit 20 further comprises a printed output station 26 for physical output of the final printed product such as printed paper, transparencies or other recording media sheets including the specified toner, ink or other colorant deposited thereon as defined by the CMYK output pixels O of the output image OG. Examples of suitable commercially available systems 10 include, but are not limited to, the Phaser™, WorkCentre™, DocuColor™, iGenr™ and iGen4™ printing/copying/digital press systems available from Xerox Corporation.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A halftoning process for printing digital images, said halftoning process comprising:
    receiving CMYK input pixel data that define an input pixel of an input digital image in terms of continuous tone input data values for cyan, magenta, yellow, and black colors, wherein I(C), I(M), I(Y), I(K) respectively correspond to said continuous tone input data value for said cyan, magenta, yellow, and black colors;

converting said CMYK input pixel data to modified CMYKRGB* pixel data that define said input pixel in terms of error-adjusted continuous tone data values for said cyan, magenta, yellow, and black colors, and also in terms of red, green and blue colors, wherein I*(C), I*(M), I*(Y), I*(K), I*(R), I*(G), I*(B) respectively correspond to said error-adjusted converted continuous tone input data values for said cyan, magenta, yellow, black, red, green, blue colors;

quantizing said modified CMYKRGB* pixel data to derive intermediate output CMYKRGB pixel data in which said cyan, magenta, yellow, black, red, green, and blue colors are each defined by either a first quantized value that represents no color or a second quantized pixel value that represents full color, wherein O'(C), O'(M), O'(Y), O'(K), O'(R), O'(G), O'(B) respectively define said intermediate output pixel data for said cyan, magenta, yellow, black, red, green, and blue colors, and wherein said intermediate output CMYKRGB pixel data define an output pixel that corresponds to said input pixel;

converting said intermediate output CMYKRGB pixel data to CMYK output data in which said output pixel is defined in terms of CMYK output values O(C), O(M), O(Y), O(K) respectively for said cyan, magenta, yellow, and black colors, wherein each of said CMYK output values is defined by either a first output value representing no color or a second output value representing full color.

2. The halftoning process of claim 1, further comprising:
deriving CMYK error values E(C), E(M), E(Y), E(K) corresponding respectively to said cyan, magenta, yellow, and black colors, wherein said CMYK error values E(C), E(M), E(Y), E(K) are determined as function of a difference between said input CMYK pixel data I(C), I(M), I(Y), I(K) and said corresponding CMYK output value O(C), O(M), O(Y), O(K), respectively.

3. The halftoning process as set forth in claim 2, wherein said step of converting said CMYK input pixel data to modified CMYKRGB* pixel data comprises:
a first classifying step of classifying said CMYK input pixel data as being a first class if said CMYK input pixel data defines a blue color, and classifying said CMYK input pixel data as being a second class if said CMYK input pixel data does not define a blue color.

4. The halftoning process as set forth in claim 3, wherein said CMYK input pixel data is determined to define a blue color if said CMYK pixel data includes cyan and magenta colors overlapped with each other.

5. The halftoning process as set forth in claim 4, wherein said step of classifying said CMYK input pixel data as being in either said first class or said second comprises:
classifying said CMYK input pixel data as being in said first class if SP>0, and otherwise classifying said original CMYK input pixel data as being in said second class, wherein:
said original continuous tone input data values I(C), I(M), I(Y), I(K) of said CMYK input pixel data are normalized to be in the range of 0 to 1; and
SP=I(C)+I(M)+I(K)−1.

6. The halftoning process as set forth in claim 5, wherein said step of converting said CMYK input pixel data to modified CMYKRGB* data comprises an intermediate conversion step of converting said CMYK input pixel data to CMYKBW pixel data, wherein W corresponds to white color, I(W) corresponds to a continuous tone value for said white color, and I*(W) corresponds to an error-adjusted continuous tone value for said white color, and wherein:
if the CMYK input pixel is classified as being in said first class (containing blue), a first conversion step is performed to convert the CMYK input pixel data into said CMYKBW as follows: SP=I(C)+I(M)+I(K)−1 SP*=I*(C)+I*(M)+I*(K)
I(B)=SP I(W)=0 I(C)=(C)−SP I(M)=I(M)−SP
I*(B)=SP* I*(W)=0 I*(C)=I*(C)−SP* I*(M)=I*(M)−SP*
I(Y)=I(Y) I(K)=I(K)
if the CMYK input pixel is classified as being in said second class (not containing blue a second conversion step is performed to convert the input pixel I into CMYKBW color space as follows: SP=I(C)+I(M)+I(K)−1 SP*=I*(C)+I*(M)+I*(K)
I(B)=0 I(W)=−SP
I*(B)=0 I*(W)−SP*
I(Y)=I(Y) I(C)=I(C) I(M)=I(M) I(K)−I(K).

7. The halftoning process as set forth in claim 6, further comprising a second classification step for each input pixel classified as being in said first class (containing blue), said second classification step comprising:
classifying said CMYK input pixel as one of KBMGC, KBRMG, or K(CMY)BRG according to:
if I(Y)>1−I(K)−I(B), class=K(CMY)BRG
if 1−I(K)−I(B)≧I(Y)>1−I(K)−I(B)−I(C), class=KBRMG
otherwise 1−I(K)−I(B)−I(C)≧I(Y), class=KBMGC 8. The halftoning process as set forth in claim 7, further comprising, for class=K(CMY)BRG, a third conversion step according to:
I*(CMY)=I*(Y)−I*(C)−I*(M)
I*(B)=I*(B)−I*(CMY)
I*(G)=I*(C) I*(R)=I*(M)
I*(W)=I*(Y)=I*(C)=I*(M)=0
I*(K)=I*(K).

9. The halftoning process as set forth in claim 7, further comprising, for class=KBRMG, a third conversion step according to:
I*(R)=I*(Y)−I*(C)
I*(M)=I*(M)−I*(R)
I*(B)=I*(B) I*(K)=I*(K)
I*(G)=I*(C)
I*(W)=I*(Y)=I*(C)=I*(CMY)=0.

10. The halftoning process as set forth in claim 7, further comprising, for class=KBMGC, a third conversion step according to:
I*(G)=I*(Y)
I*(C)=I*(C)−I*(Y)
I*(B)=I*(B) I*(K)=I*(K)
I*(M)=I*(M)
I*(W)=I*(Y)=I*(R)=I*(CMY)=0.

11. The halftoning process as set forth in claim 6, further comprising, for each input pixel classified as being in said second class (not containing blue), a second classification step comprising:
classifying said CMYK input pixel as one of KMCYW, KMGCY, or KRMGY according to:
if I(Y)>1−I(K)−I(M), class=KRMGY
if 1−I(K)−I(M)≧I(Y)>1−I(K)−I(M)−I(C), class=KMGCY
otherwise 1−I(K)−I(M)−I(C)≧I(Y), class=KMCYW.

12. The halftoning process as set forth in claim 11, further comprising, for class=KRMGY, a fourth conversion step according to:
$$I^*(R)=I^*(Y)-I^*(C)-I^*(W)$$
$$I^*(M)=(M)-I^*(R)$$
$$I^*(Y)=I^*(W)$$
$$I^*(G)=I^*(C)$$
$$I^*(W)=I^*(C)=I^*(B)=I^*(CMY)=0$$
$$I^*(K)=I^*(K).$$

13. The halftoning process as set forth in claim 11, further comprising, for class=KMGCY, a fourth conversion step according to:
$$I^*(G)=I^*(Y)-I^*(W)$$
$$I^*(C)=I^*(C)-I^*(G)$$
$$I^*(M)=I^*(M)$$
$$I^*(Y)=I^*(W)$$
$$I^*(W)=I^*(R)=I^*(B)=I^*(CMY)=0$$
$$I^*(K)=I^*(K).$$

14. The halftoning process as set forth in claim 11, further comprising, for class=KMCYW, a fourth conversion step according to:
$$I^*(Y)=I^*(Y)$$
$$I^*(W)=I^*(W)-I^*(Y)$$
$$I^*(C)=I^*(C)$$
$$I^*(M)=I^*(M)$$
$$I^*(R)=I^*(G)=I^*(B)=I^*(CMY)=0$$
$$I^*(K)=I^*(K).$$

15. The halftoning process as set forth in claim 1, further comprising:
receiving error values E(C), E(M), E(Y), E(K) that correspond respectively to said cyan, magenta, yellow, and black colors and that are calculated based upon a previous quantization operation for a previous CMYK input pixel of said input image;
calculating said error-adjusted converted continuous tone data values $I^*(C)$, $I^*(M)$, $I^*(Y)$, $I^*(K)$ are derived according to:
$$I^*(C)=I(C)+E(C)$$
$$I^*(M)=I(M)+E(M)$$
$$I^*(Y)=I(Y)+E(Y)$$
$$I^*(K)=I(K)+E(K)$$

16. The halftoning process as set forth in claim 1, wherein said step of quantizing said modified CMYKRGB* pixel data comprises:
comparing a first sum of $I^*(K)$, $I^*(CMY)$, $I^*(B)$, $I^*(R)$, $I^*(M)$, $I^*(G)$, $I^*(C)$, $I^*(Y)$ to a threshold t and setting each of O'(C), O'(M), O'(Y), O'(K), O'(R), O'(G), O'(B) equal to said first quantized value (no color) if said first sum is <t;
if said first sum is ≧t, comparing a second sum of $I^*(K)$, $I^*(CMY)$, $I^*(B)$ to the threshold t and if the second sum is ≧t, comparing $I^*(K)$ to t and, if $I^*(K)≧t$, setting O'(K) to said second quantized value (full color) and setting each of O'(C), O'(M), O'(Y), O'(R), O'(G), O'(B) to said first quantized value (no color);
if $I^*(K)<t$, comparing $I^*(CMY)$ to $I^*(B)$ and, if $I^*(CMY)$ $I^*(B)$, setting O'(CMY) to said second quantized value (full color) and setting each of O'(K), O'(R), O'(G), O'(B) to said first quantized value (no color), otherwise, if $I^*(CMY)<I^*(B)$, setting O'(B) to said second quantized value (full color) and setting each of O'(C), O'(M), O'(Y), O'(K), O'(R), O'(G) to said first quantized value (no color);
if the second sum is <t, comparing a third sum of $I^*(K)$, $I^*(CMY)$, $I^*(B)$, $I^*(R)$, $I^*(M)$ to the threshold t, and if the third sum is ≧t, comparing $I^*(R)$ to $I^*(M)$ and if $I^*(R)≧I^*(M)$, setting O'(R) to said second quantized value (full color) and setting each of O'(C), O'(M), O'(Y), O'(K), O'(G), O'(B) to said first quantized value (no color), otherwise, if $I^*(R)<I^*(M)$, setting O'(M) to said second quantized value (full color) and setting each of O'(C), O'(Y), O'(K), O'(R), O'(G), O'(B) to said first quantized value (no color);
if the third sum is <t, comparing a fourth sum of $I^*(K)$, $I^*(CMY)$, $I^*(B)$, $I^*(R)$, $I^*(M)$, $I^*(G)$, $I^*(C)$ to the threshold t and, if the fourth sum is ≧t, comparing $I^*(G)$ to $I^*(C)$ and, if $I^*(G)≧I^*(C)$, setting O'(G) to said second quantized value (full color) and setting each of O'(C), O'(M), O'(Y), O'(K), O'(R), O'(B) to said first quantized value (no color), otherwise, if $I^*(G)<I^*(C)$, setting O'(C) to said second quantized value (full color) and setting each of O'(M), O'(Y), O'(K), O'(R), O'(G), O'(B) to said first quantized value (no color);
if the fourth sum is <t, setting O'(Y) to said second quantized value (full color) and setting each of O'(C), O'(M), O'(K), O'(R), O'(G), O'(B) to said first quantized value (no color).

17. An image processing apparatus comprising:
means for halftoning an input image comprising a plurality of input pixels each defined by continuous tone CMYK values to derive an output image comprising a plurality of output pixel each defined by binary CMYK values, said means for halftoning comprising:
means for receiving CMYK input pixel data that define an input pixel of an input digital image in terms of continuous tone input data values for cyan, magenta, yellow, and black colors, wherein I(C), I(M), I(Y), I(K) respectively correspond to said continuous tone input data value for said cyan, magenta, yellow, and black colors;
means for converting said CMYK input pixel data to modified CMYKRGB* pixel data that define said input pixel in terms of error-adjusted continuous tone data values for said cyan, magenta, yellow, and black colors, and also in terms of red, green and blue colors, wherein $I^*(C)$, $I^*(M)$, $I^*(Y)$, $I^*(K)$, $I^*(R)$, $I^*(G)$, $I^*(B)$ respectively correspond to said error-adjusted converted continuous tone input data values for said cyan, magenta, yellow, black, red, green, blue colors;
means for quantizing said modified CMYKRGB* pixel data to derive intermediate output CMYKRGB pixel data in which said cyan, magenta, yellow, black, red, green, and blue colors are each defined by either a first quantized value that represents no color or a second quantized pixel value that represents full color, said intermediate output CMYKRGB pixel data defining an output pixel that corresponds to said input pixel;
means converting said intermediate output CMYKRGB pixel data to CMYK output data in which said output pixel is defined in terms of CMYK output values O(C), O(M), O(Y), O(K) respectively for said cyan, magenta, yellow, and black colors, wherein each of said CMYK output values is defined by either a first output value representing no color or a second output value representing full color.

18. The image processing apparatus as set forth in claim 17, further comprising:
means for deriving CMYK error values E(C), E(M), E(Y), E(K) corresponding respectively to said cyan, magenta, yellow, and black colors, wherein said CMYK error values E(C), E(M), E(Y), E(K) are determined as function of a difference between said input CMYK pixel data I(C), I(M), I(Y), I(K) and said corresponding CMYK output value O(C), O(M), O(Y), O(K), respectively.

19. A halftoning process for printing digital images, said halftoning process comprising:

receiving CMYK error values resulting from a first quantization operation relating to a first CMYK input pixel of an input image;

receiving CMYK input data representing a second CMYK input pixel of the input image;

converting said CMYK input data to error-adjusted CMYKRGB* pixel data using said CMYK error values;

performing a second quantization operation to quantize said error-adjusted CMYKRGB* pixel data to derive intemiediate binary CMYKRGB output pixel data;

converting said intermediate binary CMYKRGB output pixel data to binary CMYK output data in which an output pixel corresponding to said second CMYK input pixel is defined in terms of binary CMYK output values.

20. The halftoning process as set forth in claim 19, wherein said step of converting said CMYK input data to error-adjusted CMYKRGB* pixel data using said CMYK error values comprises:

converting said CMYK input data to CMYKBW color space data; and, converting said CMYKBW color space data to said error-adjusted CMYKRGB* pixel data.

* * * * *